United States Patent
Bu et al.

(10) Patent No.: US 6,974,858 B2
(45) Date of Patent: Dec. 13, 2005

(54) PROCESS OF FRACTIONATING POLYMERS

(75) Inventors: Lujia Bu, Shrewsbury, MA (US);
Charles R. Szmanda, Westborough, MA (US); Kathleen B. Spear-Alfonso, Hudson, MA (US); Kathleen M. O'Connell, Cumberland, RI (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 0 days.

(21) Appl. No.: 10/789,857

(22) Filed: Feb. 27, 2004

(65) Prior Publication Data

US 2004/0171773 A1 Sep. 2, 2004

Related U.S. Application Data

(60) Provisional application No. 60/450,368, filed on Feb. 27, 2003.

(51) Int. Cl.$^7$ ................................ C08G 64/00
(52) U.S. Cl. ................ 528/480; 524/88; 525/242; 526/72; 528/483; 528/491; 528/497; 528/498; 528/503
(58) Field of Search ................ 524/88; 525/242; 526/72; 528/480, 483, 491, 497, 498, 503

(56) References Cited

U.S. PATENT DOCUMENTS

2002/0161074 A1 * 10/2002 Zhang et al. ............... 524/88

* cited by examiner

Primary Examiner—Terressa Boykin
(74) Attorney, Agent, or Firm—Peter F. Corless; Darryl P. Frickey; Edwards & Angell, LLP

(57) ABSTRACT

Provided herein is a process of fractionating ferroelectric, preferably vinylidene fluoride polymers using a solvent having at least one polarizable functional group, and a precipitant. The composition of the fractionated ferroelectric polymers is selected so as to adjust the properties of a ferroelectric film made from the polymers. Films formed using the fractionated vinylidene fluoride polymers have improved properties, particularly with respect to roughness and crystal domain size, and suitability for use in data processing devices.

8 Claims, 1 Drawing Sheet

PROCESS OF FRACTIONATING POLYMERS

This application claims the benefit of Provisional application Ser. No. 60/450,368, filed Feb. 27, 2003.

BACKGROUND

The present invention relates to a method of fractionating mixtures of polymers, the solvents used for fractionation, and the fractionated polymers obtained thereby, which are useful for the formation of ferroelectric polymer films.

Ferroelectrics are a class of dielectric materials that can be given a permanent electric polarization by application of an external electric field. Use of ferroelectric materials in data processing devices is disclosed in U.S. Patent Application No. 2002/0044480 to Gudesen et al., which is directed to a ferroelectric data processing device comprising a thin film of ferroelectric material as a data-carrying medium. The film may be inorganic, a ceramic material, a polymer, or a liquid crystal. Gudesen does not, however, disclose how the ferroelectric films are made. Use of ferroelectric polymers in data processing devices is also described, for example, by Y. Tajitsu et al., in "Investigation of Switching Characteristics of Vinylidene Fluoride/Trifluoroethylene Copolymers in Relation to Their Structures", (Japanese Journal of Applied Physics, Volume 26, pp. 554–560, 1987).

It is known that only certain vinylidene fluoride polymers are ferroelectric, and the presence of ferroelectricity is due at least in part to the history of the film, including the thermal history of the film and the solvent used to form the film. See, e.g., the Abstract of an article by Cho, in *Polymer*, Volume 15, p. 67 (1991). Recently, Tashiro et al., in Macromolecules, Volume 35, p. 714 (2002) performed a detailed structural analysis of the various vinylidene fluoride crystal morphologies. Vinylidene fluoride polymers occur in four distinct crystal morphologies, all monoclinic. Without intending to bound by theory, form I has essentially planar zigzag chains forming a polar structure in which $CF_2$ dipoles are parallel to each other along the crystallographic b-axis. The chains are tightly packed and tend to form large crystals. In form II, the $CF_2$ dipoles are packed in anti-parallel mode along the b-axis. Form II is therefore nonpolar and less tightly packed than form I. Form III is also a tightly packed polar unit cell, and is obtained by casting from highly polar (but not necessarily hydrogen bonding) solvents such as dimethylacetamide or dimethylformamide. Form III may also be obtained by annealing forms II or IV at high temperature. Finally, form IV is a polar structure in which the chains are packed in parallel mode. Form IV is also a desirable form from the standpoint of ferroelectric properties because it can interconvert with form II. Copolymers of vinylidene fluoride exhibit similar characteristics.

In addition to ferroelectricity, a number of other properties are important in the function and use of ferroelectric polymer films, including properties related to hysteresis (including saturation potential, coercive field strength, and permittivity); reliability (such as fatigue, aging, time dependence dielectric breakdown, imprint, and relaxation); and thermodynamic properties such as the Curie transition temperature of the film. Many factors can affect these properties, for example the composition of the ferroelectric polymers, and historical factors such as the heat load applied to a particular film, the process of by which a film is made, the solvent used to make a film, and mechanical stresses applied to the film. While there have been several attempts to improve the techniques used to form vinylidene fluoride films, there has been less emphasis on controlling the composition of the vinylidene fluoride polymer itself.

Typical synthetic procedures for vinylidene fluoride polymers yield mixtures of polymers with differences among these attributes. For example, Furukawa et al., in Adv. Colloid and Interface Sci., Vol. 71–72, p. 183 (1997), discusses the relationship between polymer composition of vinylidene fluoride-trifluoroethylene copolymers, and Curie temperature, the temperature at which a transition between the ferroelectric and paraelectric state occurs, finding that Curie temperature is very sensitive to composition. In addition, composition affects the full-scale displacement in polarization of ferroelectric vinylidene fluoride-hexafluoropropylene copolymers, as discussed by Ambalangodage et al. in Appl. Surf. Sci/Vol. 175–176, pg. 386 (2001).

U.S. Pat. No. 4,946,913 to Kappler is directed to controlling the molar composition and molecular weight of ferroelectric vinylidene fluoride and trifluoroethylene copolymers by adjustment of the reaction conditions for forming the polymers (i.e., rate of addition monomer addition, time, temperature, pressure, "protection colloid" and reaction initiator). However, there appear to be no reports of methods for adjusting or optimizing the molecular weight distribution of ferroelectric polymers in particular.

General methods for adjusting molecular weight distributions include processes such as chromatographic separation, and mixed solvent fractionation. As described in "Polymer Fractionation", (Springer-Verlag, (1994), Chapter 4, by Francuskiewicz), in mixed solvent fractionation a solution of a dissolved polymer is treated with solvent-miscible polymer precipitant (also referred to as an anti solvent or a non-solvent) thereby causing a portion of the polymer to separate from the solution. These fractions of precipitated polymers may then be removed consistent with the desired outcome. Three factors that should be considered in selection of both the solvent and the precipitant include the solubility strength of the solvent, the precipitation strength of the precipitant, and the miscibility of the solvent and the precipitant. According to Francuskiewicz, neither the solvent nor the precipitant should be too strong, the solvent-precipitant system should display a high sensitivity to temperature, and the system should have a lower density than the polymer. However, the inventors hereof have found that these factors alone are insufficient to provide effective methods for the fractionation of vinylidene fluoride polymers such that the result is a narrow molecular weight distribution and a specific composition.

U.S. Pat. No. 5,264,536 to Radosz discloses use of mixed solvent fractionation of polymer mixtures to further narrow the molecular weight distribution of polyolefins beyond that achievable by mere control of reaction conditions. Fractionation of ferroelectric polymers is not disclosed. This method, however, requires use of supercritical solvents, which has practical limitations. Further, neither method has been shown to be applicable to vinylidene fluoride polymers, particularly ferromagnetic vinylidene fluoride polymers. Accordingly, there remains a need for economical, highly reproducible methods for the manufacture of ferroelectric polymers having a narrow molecular weight distribution, and in particular a weight distribution that allows the production of films, in particular films suitable for use as memory devices.

STATEMENT OF THE INVENTION

In one aspect of the present invention, a process of fractionating a vinylidene fluoride polymer comprises adding a precipitant to a solution comprising a vinylidene fluoride polymer and a solvent to form a mixture, wherein the solvent has at least one polarizable functional group, wherein the precipitant is miscible with the solvent, and wherein the precipitant is added in an amount sufficient to produce, at a first temperature, a solid-liquid phase separation between the mixture and a fraction of the vinylidene fluoride polymer, based on the molecular weight of the polymer; and isolating the weight-fractionated vinylidene fluoride polymer from the mixture.

In other aspects, there is provided a vinylidene fluoride polymer produced by the above method, a film comprising a vinylidene fluoride polymer produced by the above method, a method for producing a film comprising a vinylidene fluoride polymer produced by the above method, and a data processing device comprising the film, wherein the film used in the data processing device is ferroelectric.

In another aspect of the present invention, there is provided a vinylidene fluoride polymer having a molecular weight distribution ratio of less than 1.3.

In other aspects, there is provided a film comprising the vinylidene fluoride polymer having a molecular weight distribution ratio of less than 1.3, a method for producing a film comprising a vinylidene fluoride polymer having a molecular weight distribution ratio of less than 1.3, and a data processing device comprising the film, wherein the film used in the data processing device is ferroelectric.

In still another aspect of the present invention, a process of fractionating a ferroelectric polymer comprises adding a precipitant to a solution comprising a ferroelectric polymer and a solvent to form a mixture, wherein the solvent has at least one polarizable functional group, wherein the precipitant is miscible with the solvent, and wherein the precipitant is added in an amount sufficient to produce, at a first temperature, a solid-liquid phase separation between the mixture and a fraction of the ferroelectric polymer, based on the molecular weight of the polymer; and isolating the weight-fractionated ferroelectric polymer from the mixture.

In other aspects, there is provided a ferroelectric polymer produced by the above method, a film comprising a ferroelectric polymer produced by the above method, a method for producing a film comprising a ferroelectric polymer produced by the above method, and a data processing device comprising the film.

In yet another aspect of the invention, there is provided a ferroelectric polymer having a molecular weight distribution ratio of less than 1.3.

In other aspects, there is provided a film comprising the ferroelectric polymer having a molecular weight distribution ratio of less than 1.3, a method for producing a film comprising a ferroelectric polymer having a molecular weight distribution ratio of less than 1.3, and a data processing device comprising the film.

It has been unexpectedly discovered that control of, and improvement in, the properties of ferroelectric polymers, such as solubility, film-forming characteristics, surface roughness of cast films, and crystallinity may be achieved by control of the molecular weight and the molecular weight distribution (polydispersity) of the polymers. Such control, particularly lower polydispersity, may be reliably and economically obtained by a mixed solvent fractionation procedure.

It has further unexpectedly been discovered that the selection of solvents for the mixed solvent fractionation procedure affects the molecular weight distribution and composition of the polymer fractions. In particular, the solvent is selected so as to be slightly or moderately polar and to have polarizability. Selection of a solvent having the combination of polarizability and low to moderate polarity results in excellent separation of ferroelectric polymers having particular characteristics, particularly polydispersity.

DETAILED DESCRIPTION

Figure 1:
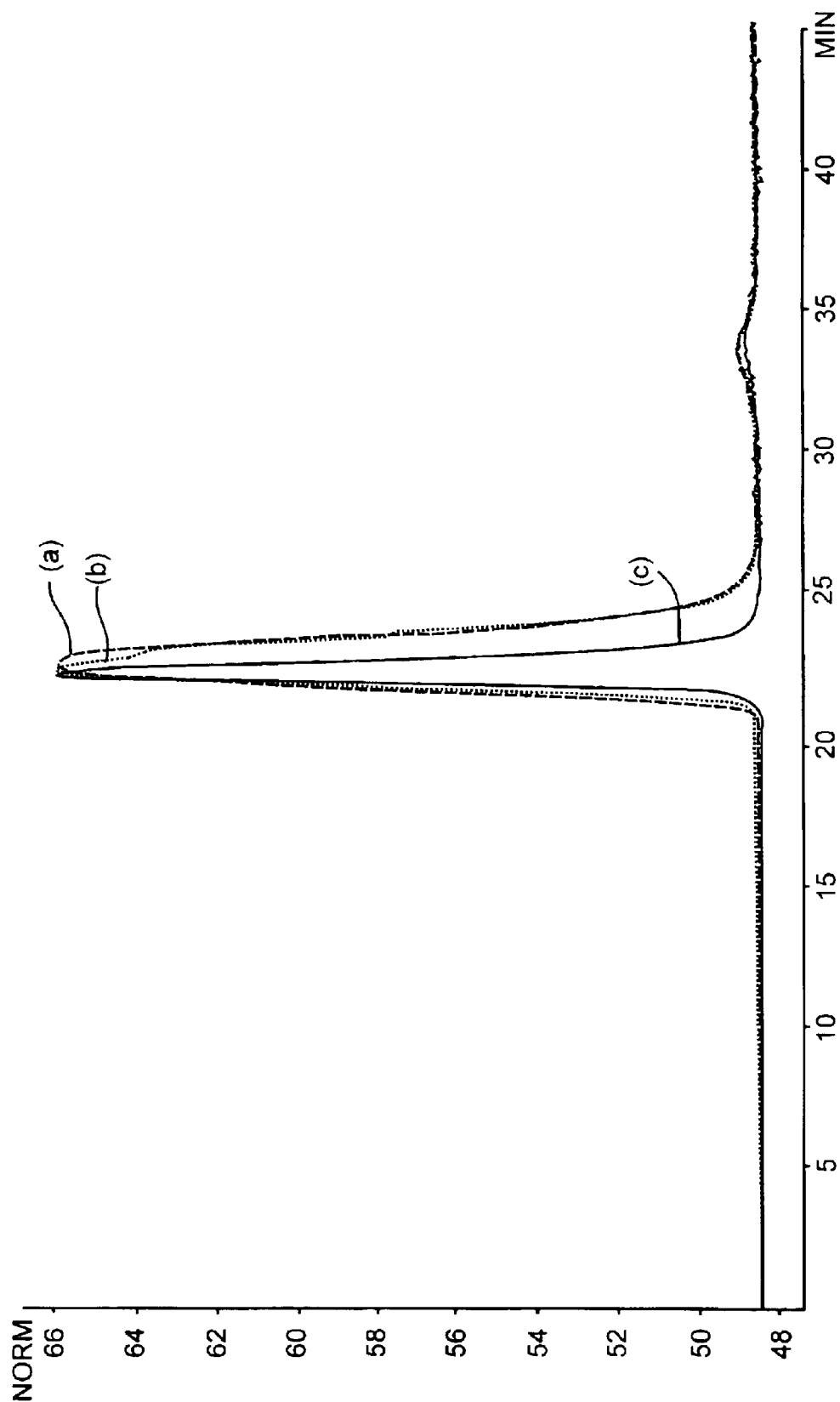
FIG. 1 is a chromatogram showing (a) a vinylidene fluoride polymer composition that has not been fractionated; (b) a vinylidene fluoride polymer composition fractionated with a control solvent composition not in accordance with the present invention (tetrahydrofuran); and (c) a vinylidene fluoride polymer composition fractionated with a solvent having at least one polarizable functional group (acetonitrile) and having a narrower molecular weight distribution.

Organic polymers that display ferroelectric properties, and that are suitable for the formation of ferroelectric polymer films, include those derived from vinylidene fluoride, trifluoroethylene, chlorotrifluoroethylene, hexafluoropropene, vinylidene chloride, vinyl fluoride, vinyl chloride, or a mixtures comprising at least one of the foregoing monomers. Other organic polymers are also known to possess ferroelectric properties, for example certain nylons. As discussed above, only certain forms of these polymers may be ferroelectric. "Ferroelectric polymers" as used herein is inclusive of polymers that either possess ferroelectric properties or are capable of possessing ferroelectric properties, for example by heat treatment.

Vinylidene fluoride polymers are preferred ferroelectric polymers. As used herein, a vinylidene fluoride polymer refers to a homopolymer derived from vinylidene fluoride, or a copolymer derived from vinylidene fluoride monomer units and other, optional copolymerized co-monomer units, particularly tetrafluoroethylene, trifluoroethylene, chlorotrifluoroethylene, hexafluoropropene, vinylidene chloride, vinyl fluoride, vinyl chloride, or a mixtures comprising at least one of the foregoing co-monomers. Also included are pre-polymers that form vinylidene fluoride polymers upon formation of an article, for example a film.

Other co-monomers may also be present to adjust the properties of the final film, for example, acrylonitrile, acrylamide, methyl methacrylate, ethyl methacrylate, butyl methacrylate, octyl methacrylate, methacrylic acid, methyl acrylate, ethyl acrylate, butyl acrylate, octyl acrylate, 2-hydroxyethyl acrylate, glycidyl acrylate, acrylic acid, maleic anhydride, vinyl acetate, styrene, alpha-methyl styrene, trimethoxyvinylsilane, triethoxyvinylsilane, norbornene, and butadiene. Oligomers and pre-polymers such as polyvinylidene fluoride and ethylene-tetrafluoroethylene alternating copolymer may also be used. These polymerizable monomers can be used either singly, or as a combination of two or more co-monomers, such as terpolymers, and tetrapolymers.

The above-described co-monomers may be present in amounts of less than or equal to 50 mol %, preferably less than or equal to 30 mol % of the total polymer. When present, they are generally included in amounts of greater than or equal to 0.5 mol %, preferably greater than or equal to 1 mol %, more preferably greater than or equal to 2 mol % of the total polymer.

A preferred polymer comprises vinylidene fluoride, which may be copolymerized with trifluoroethylene, hexafluoropropylene, or both. Vinylidene fluoride monomer is thus present in a concentration of 10 to 100 mole percent (mol %), based on the total polymer composition. Within this range, a vinylidene fluoride monomer concentration of greater than or equal to 50 mol % can be employed, with greater than or equal to 70 mol % preferred. Also preferred within this range is a vinylidene fluoride monomer concentration of less than or equal to 90 mol %, with less than or equal to 85 mol % more preferred.

Trifluoroethylene monomer, when present, comprises up to 90 mol % of the total vinylidene fluoride polymer. Within this range, a trifluoroethylene monomer concentration of greater than or equal to 10 mol % can be employed, with greater than or equal to 20 mol % preferred. Also preferred within this range is a trifluoroethylene concentration of less than or equal to 50 mol %, with less than or equal to 30 mol % more preferred. Hexafluoropropylene monomer, when present, comprises up to 50 mol % of the total weight of the vinylidene fluoride polymer. A hexafluoropropylene monomer concentration of greater than or equal to 10 mol % can be employed, with greater than or equal to 15 mol % preferred.

The polymerization conditions to provide vinylidene fluoride polymers are well known. Vinylidene fluoride polymers can be made by bulk, solution, suspension, or emulsion polymerization. A small amount of an initiator, such as an organic peroxide may be present. Once polymerization has occurred, the un-reacted monomers may be removed, for example, by heating, by placing the polymer under a vacuum, by washing with an appropriate solvent, or by a combination comprising at least one of the foregoing purification steps. In addition, vinylidene fluoride polymers are commercially available, for example the co-(vinylidene fluoride trifluoroethylene) available from Solvay Corporation. Vinylidene fluoride polymers suitable for the formation of ferroelectric films preferably have a molecular weight of 5 to 250 kiloDaltons (kDa). Within this range, a molecular weight of greater than or equal to 20 kDa, preferably greater than 30 kDa can be employed, with less than or equal to 80 kDa preferred, and less than or equal to 60 kDa more preferred.

The inventors hereof have discovered that control and improvement in the properties of ferroelectric polymers, particularly polydispersity, may be reliably and economically obtained by mixed solvent fractionation, using the additional parameters for selection of the solvents as described herein. The fractionation method comprises dissolving the polymer in a solvent wherein the solvent is selected so as to be slightly or moderately polar but have polarizability or have polarizable moieties. Selection of a solvent having the optimal combination of nonpolarity and polarizability results in excellent separation of ferroelectric polymers having particular characteristics, particularly polydispersity. Use of such fractionated ferroelectric polymers as precursors for forming a ferroelectric film thus allows for control of the properties of a ferroelectric film produced therewith.

The preferred solvent is thus one that has low to moderate polarity and comprises at least one polarizable functional group. One convenient measure of polarity is the polar solubility parameter component, $\delta_p$, as described by Barton in "Handbook of Solubility Parameters and Other Cohesion Parameters," CRC Press, (1991), Chapter 5. A solvent having a $\delta_p$ of less than 22 MPa$^{1/2}$ is considered as having low to moderate polarity. Within this range, a polar solubility parameter of less than or equal to about 20 MPa$^{1/2}$ is preferred.

Polarizability generally arises from the presence of a polarizable functional group. Polarizable functional groups include, for example, nitriles, halogens, aromatic rings, nitro groups, amines, aldehydes, ketones, esters, amides, sulfones, alcohols, as well as combinations of these functional groups. Further, the solvent molecule may contain combined functionality that produces energetically available tautomers such as, for example, n,(n+2) diketones, β-ketoesters, imides, enols and the like. In addition, a combination of one of the above groups with an ether group is also useful. Certain halogenated solvents such as dichloromethane, chlorobenzene and o-dichlorobenzene do not dissolve vinylidene fluoride polymers and copolymers Preferably, the solvent has a polarizability of 4 to 20 cubic angstroms (Å$^3$).

Additionally, the polymer is soluble in the solvent, preferably at room temperature. Certain halogenated solvents such as, for example, dichloromethane, chlorobenzene and o-dichlorobenzene do not dissolve vinylidene fluoride polymers and copolymers, and are, therefore, not suitable for use with these polymers. Preferred solubilities are 2 to 50 weight percent (wt %). Within this range, a solubility of greater than or equal to about 5 wt % is preferred. It is preferable from a manufacturing standpoint that the solvent not pose a significant health or safety hazard to users, for example, the solvent preferably has a flashpoint higher than 38° C. (100° F.), is noncarcinogenic, reproductively non-toxic, non-corrosive, a non-sensitizer and a non-allergen. Notwithstanding the foregoing, solvents that exhibit environmental or toxicity hazards can be used safely if the proper precautions are taken to prevent worker exposure and/or environmental release.

Suitable solvents having the above characteristics include, for example, acetonitrile, formamide, nitromethane, nitroethane, nitropropane, nitrobutane, nitroisopropane, nitroisobutene, nitro-tert-butane, acetaldehyde, methyl formate, acetamide, N-methyl formamide, dimethyl sulfone, propionitrile, isopropionitrile, butyronitrile, isobutyronitrile, tert-butryonitrile, benzonitrile, N-methyl formamide, N, N-dimethyl formamide, diethyl carbonate, ethyl lactate, methyl lactate, propyl lactate, butyl lactate, isopropyl lactate, isobutyl lactate, tert-butyl lactate, methyl 2-methoxy propionate, ethyl 2-methoxy propionate, propyl 2-methoxy propionate, isopropyl 2-methoxy propionate, butyl 2-methoxy propionate, isobutyl 2-methoxy propionate, tert-butyl 2-methoxy propionate, biacetyl, pentane-2,4-dione, hexane-2,4-dione, hexane-3,5-dione, heptane-2,4-dione, heptane 3,5-dione, pyridine, 2-methyl pyridine, 3-methyl pyridine, 4-methyl pyridine, 3-oxo-butyric acid methyl ester, 3-oxo-butyric acid ethyl ester, 3-oxo-butyric acid propyl ester, and mixtures comprising one or more of the foregoing solvents. Solvents such as anisole, acetone, ethanol, tetrahydrofuran, dioxane, and methanol are less preferred.

Without being bound by theory, it is believed that polarizable solvents such as acetonitrile or pentane-2,4-dione are effective because they solvate both the relatively nonpolar and the more polar portions of the polymer. The nonpolar characteristics of the solvent are believed to solvate the partially positively-charged hydrogen rich zones of the polymer, while the polarizable functional group of the solvent is believed to solvate the partially negatively-charged fluorine rich zones, likely through induced dipole interactions.

Fractionation occurs by adding a precipitating solvent ("precipitant") to the ferroelectric polymer solution to provide two phases (e.g., a solid phase and a liquid phase). While the vinylidene fluoride polymer fraction is less soluble in the precipitant, the precipitant is miscible with the first solvent. Precipitating non-solvents are selected so as to miscible with the solvent and include, for example, water, methanol, ethanol, linear, branched and cyclic aliphatic hydrocarbons, aromatic and substituted aromatic hydrocarbons, and Suitable solvent-precipitant systems for use herein include, for example, acetonitrile and water, butyronitrile and water, benzonitrile and water, and pentane-2,4-dione and $C_5$–$C_{15}$ hydrocarbon, preferably hexane.

The amount of precipitant used will depend on factors such as the type of polymer, the concentration of polymer, the type of precipitant, the temperature during addition, and similar considerations. For example, the precipitant may be added to the solution at room temperature until a solid phase forms, thereby fractionating the polymer based on molecular weight. It is to be understood that while the fraction having a narrower molecular weight distribution is most commonly found in the solid phase, it may also be isolated from the liquid phase, depending on fractionation conditions.

In one embodiment, the precipitant is added to the polymer-solvent solution until the solid phase starts to form, and the temperature of the solution is then increased so as to cause the solid phase (i.e., the precipitate) to redissolve in the solution (i.e., the cloudy solution formed will once again become clear). This mixture is then cooled in a controlled manner to precipitate the polymer fraction. The cooling of the solution is preferably at a rate of less than 10 degrees Celsius per hour (° C./hr). A cooling rate of less than or equal to 5° C./hr is preferred, and less than or equal to 1° C./hr more preferred; also preferably within a total cooling time of 24 to 72 hours.

In another embodiment, the precipitant is added to the solution simultaneous with heating the solution such that no precipitate actually forms. After a predetermined amount of precipitant has been added, the solution undergoes controlled cooling as described above to precipitate the polymer fraction. Suitable amounts and temperatures with depend on the polymer, solvent, and precipitant, and are readily determined by one of ordinary skill in the art.

Once the solid polymer fraction has precipitated from the solution, it may be removed by processes known in the art, including, for example, filtration, and centrifugation. The phase containing the desired fraction is isolated, for example, by filtering the solid from the mother liquor (i.e., the liquid phase). Optionally, the mother liquor from which the first fraction was removed can be fractionated a plurality of times to yield a plurality of fractions. The isolation of one or more of these fractions leads to a polymer with a narrower molecular weight distribution, and preferably with and a more uniform composition, than was obtained during the polymer synthesis.

The amount that the molecular weight distribution can be narrowed will depend on the molecular weight and composition of the polymer initially dissolved in solution, the solvents used, the number of times that the polymer is fractionated, and the like. The molecular weight distribution of the fractionated polymer can be narrowed by 5 to 90% over the initial molecular weight distribution. Within this range, the molecular weight distribution can be narrowed by greater than or equal to 10%, greater than or equal to 25%, preferably greater than or equal to 40%, over the initial molecular weight distribution. Also within this range, the molecular weight distribution can be narrowed by less than or equal to 75%, less than or equal to 60%, preferably less than or equal to 50%, over the initial molecular weight distribution.

After fractionation, the molecular weight distribution ratio ($M_w/M_n$) of the polymer fraction, as measured by gel-permeation chromatography using tetrahydrofuran as the eluant and evaporative light scattering detection, is preferably 1.01 to 1.5. Within this range, a molecular weight distribution ratio of less than or equal to 1.3 is preferred, and less than or equal to 1.2 more preferred.

Once fractionated, one or more of the isolated fractions may be used to form articles such as films. It is to be understood that the polymer may have ferroelectric properties during the above-described process, or may be treated subsequently, for example with heat, to render the polymer ferroelectric.

In addition to the fractionated polymer, suitable film-forming precursor compositions may further comprise additives known in the art, for example surface-active agents to improve coating properties. The surface active agent may include, for example, polyoxyethylene lauryl ether, polyoxyethylene octyl phenyl ether, polyoxyethylene nonyl phenyl ether, polyoxyethylene glycol dilaurate, polyoxyethylene glycol distearate, as well as organofluoro surfactants including those available commercially under the trade names Megafax F171, F172, F173, F471, R-07, R-08, (available from Dainippon Ink & Chemicals, Incorporated), Fluorad FC171, FC430, FC431 (available from 3M Corporation), ASAHI GUARD AG710, Surflon S-382, SC-101, SC-102, SC-103, SC-104, SC-105, SC-106 (available from Asahi Glass Co., Ltd.), KP341 (available from Shin-Etsu Chemical Co., Ltd.), Polyflow No. 75, No. 95 (available from Kyoeisha Chemical Co., Ltd.), Silwet L-7604 (available from Witco Chemical Corp.), and NBX-7, NBX-8, NBX-15 (available from NEOS Company Limited), and mixtures comprising one or more of the foregoing surface active agents.

The polymer films may be formed from the precursor composition by wet processes using, for example, solvents and dispersions. Such processes include, for example, casting, blade coating, roll coating, spin coating, dipping, and spray coating, as well as printing methods such as lithography, relief printing, intaglio, perforated plate printing, screen-printing, and transfer printing. Still other wet processes of forming films include electrochemical methods such as, for example, electrodeposition, electropolymerization, micelle electrolysis (see, for example, JP-A-63-243298), and Langmuir blow-jet methods using monomolecular films formed on water. The process by which the ferroelectric polymer precursors are formed into films can also include a combination comprising at least one of the foregoing processes, with spin coating methods being preferred.

Wet processes to form the films require use of a second solvent composition, which is subsequently removed. Suitable solvent compositions may comprise a single solvent or a mixture of miscible solvents, and are those that dissolve and retain the polymer in solution, preferably with other solutes that may be present in the precursor composition, through a range of concentrations. Preferably, the solvent is effective to provide a solution comprising at least 4 wt % of the precursor composition, preferably greater than 8 wt %, and more preferably greater than 10 wt %, exclusive of components intended to be insoluble such as, for example particulate inorganic fillers. The solvent furthermore can be one that evaporates to form a smooth, preferably defect-free film. In addition it is preferable from a manufacturing standpoint that the solvent not pose a significant health or safety hazard to users, for example by having a flashpoint higher than 38° C. (100° F.).

In practice, the polymer film precursor composition is dissolved in the solvent composition, and the film is formed by one or more of the above-described film-forming methods. For example, in spin casting, a solution comprising 1 to 10 weight percent (wt %) of the film forming polymer and optional additives can be applied to a substrate rotating at 500 to 10,000 revolutions per minute (RPM) at a temperature of 15 to 30° C. The spin-coated film can then be heated, e.g., baked on a hotplate, at 80 to 145° C.

Adhesion promoters may optionally be used in the production of the films. Suitable adhesion promoters include, for example, hexamethyldisilazane, trimethylsilyl diethylamine, N-(n-butyl)-3-aminopropyltrimethoxysilane, 2-aminoethyltrimethoxysilane, 3-aminopropyltriethoxysilane, N-methyl-gamma-aminopropyltrimethoxysilane, and triamino-modified propyltrimethoxysilane (e.g. the adhesion promoter available under the trade name Dynasylan-Triamo, commercially available from Dynamit Nobel Chemie), and mixtures comprising one or more of the foregoing adhesion promoters. In addition, adhesion layers such as acrylics, polyesters, and combinations thereof may be used to promote adhesion between the active ferroelectric layer and a substrate and the active ferroelectric and the top conductor electrode. Accordingly, a solution of low molecular weight polymethylmethacrylate, polymethacrylates, polyethylene terephthalate, or a combination thereof can be used to deposit an adhesion promoting layer by, for example, spin coating.

The polymer film may be used in the form in which it was originally prepared, or it may undergo additional processing steps, for example heat treatment to render the polymer ferroelectric, crosslinking, irradiation with an electron beam having an energy greater than 5 kiloelectron volts (keV) and a dose greater than 0.5 micro Curies per square centimeter ($C/cm^2$), or irradiation with x-radiation having a wavelength of less than 20 nm and a dose greater than 1 milli Joule square centimeter ($mJ.cm^2$). The film may also be stretched along one or more axes; heat treated by, e.g., annealing, at a temperature of 100° C. to 130° C., for 1 minute to 12 hours; the film may be coated with a conducting or semiconducting passivation layer such as, for example, colloidal graphite, a conducting polymer such as partially ionized polythiophene, poly(3,4-ethylene dioxythiophene)-poly(styrenesulphonate) (PEDOT-PSS, supplied by Bayer AG), or partially ionized polyaniline, or evaporated small molecules such as 2-amino-1H-imidazole-4,5-dicarbonitrile, and evaporated donor-accepter complexes such as tetrathiafulvalene-tetracyanoquinodimethane or may have an inorganic layer such as indium-tin oxide. The additional conditioning steps may also include any combination comprising at least one of the foregoing treatments.

The thickness of the polymer film is dependent on the final application. For example, when the polymer film is to be used in a data processing device, the film preferably has a thickness of 5 to 350 nanometers (nm). Within this range, a thickness of greater than or equal to 15, preferably 20 nm is preferred. Also preferred within this range is a thickness of less than or equal to 50 nm with less than or equal to 25 nm more preferred.

The films formed with the fractionated polymers or prepolymers have improved properties that may be adjusted depending on the polymer fraction used and the desired end use. The films may have an average roughness, as measured as a mean-square deviation using atomic force microcopy (AFM) of 300 angstroms (Å) or less, with less than or equal to 150 Å preferred, less than or equal to 100 Å more preferred, and less than or equal to 75 Å most preferred. The foregoing roughness is desirable for reproducibility, reliability, reduced polling fatigue, good electrode contact, and dense packing in data processing devices.

In addition, the polymer film has an average crystal domain size, as measured by AFM, of 1 to 10 nanometers. Within this range, an average domain size of less than or equal to 8 nanometers is preferred, with less than or equal to 6 nanometers more preferred, and less than or equal to 2 nanometers most preferred. As such, the films have decreased average domain sizes, which is desirable for reproducibility, reliability, reduced polling fatigue, and for providing good electrode contact and dense packing in data processing devices.

A variety of other film properties may be adjusted including polydispersity, properties related to hysteresis (e.g., saturation potential, coercive field strength, and permittivity); reliability (e.g., fatigue, aging, time dependent dielectric breakdown, imprint, and relaxation); kinetic properties (e.g., switching time); and thermodynamic properties (e.g., Curie transition temperature of the film).

The ferroelectric polymer films can have a polydispersity of 1.0 to less than or equal to 3, preferably less than or equal to 2, with less than or equal to 1.5 more preferred, and less than or equal to 1.3 most preferred.

Hysteresis is the observed lagging or retardation of the polarization effect when the electric field acting upon a ferroelectric polymer film is changed from a previously induced condition. The shape and magnitude of a hysteresis loop are characteristic of a particular ferroelectric material. Hysteresis can be shown graphically in a plot of the observed polarization (P) verses the magnitude of the applied electric field (E). For example, as the electric field is increased, the crystalline domains of the film become oriented with the field. When no further reorientation can occur, the curve becomes flat. The polarization value at the intersection of a line extrapolated to the polarization axis at E=0, is the saturation polarization. The magnitude of the polarization at E=0 on the hysteresis loop is the remnant polarization.

In terms of a ferroelectric polymer film, polling fatigue refers to a decrease in the remnant polarization during repeated cycling of the hysteresis curve at a given drive amplitude. For example, at a drive amplitude of 100 mega Volts per meter (MV/m), full scale (Coercive field strength, Ec, of 50 MV/m), the remnant polarization can be reduced by 80 to 90% of its unpolled value in 100 cycles. Preferably the reduction in remnant polarization should be no more than 70% in 100 cycles at Ec=50 MV/m. Within the range of 0 to 70%, a reduction in remnant polarization of no more than 60% is more preferred, while a reduction of no more than 50% is most preferred.

Alternatively, the difference between the remnant polarization and the saturation polarization of the ferroelectric polymer film, as measured according to Fedosov, (see Electrical Properties of Ferroelectric Polymers During the Switching of Polarization, Sergiy Fedosov; http://www.tu-darmstadt.de/fb/ms/fg/em/Ferroelektrika.pdf), is 0.1 to 70 millicoulombs per square meter ($mC/m^2$). Within this range, a difference of less than or equal to 50 $mC/m^2$ is preferred, and less than or equal to 25 $mC/m^2$ more preferred. The coercive field strength is defined as the horizontal intercept of the hysteresis loop (designated Ec, point 10 of FIG. 2). Preferably the ferroelectric polymer film has a coercive field strength of 20–80 mega Volts per meter (MV/m) consistent with a more square hysteresis loop, as compared to, for example, pure vinylidene fluoride polymers. Also, the ferroelectric polymer film preferably has a coercivity field strength as measured according to Christie et al., J. Polymer Sci.: Part B, Vol. 35, p. 2671, (1997) of 20 to 80 MV/m. Within this range, a coercivity field strength of greater than or equal to 30 MV/m is preferred, and greater than or equal to 40 MV/m more preferred.

Another property of ferroelectric polymer films is differential permittivity, which is the slope of the hysteresis loop measured at any point on the curve. The differential permittivity of the ferroelectric material at Ec is preferably 0.5 to 15 nanocoulombs per meter per volt (nC/m*V). Within this range, a differential permittivity of greater than or equal to 1 is preferred, and greater than or equal to 2.5 nC/m*V more preferred.

As is known, the ferroelectric properties of a polymer film can be lost by transforming the polymer from its ferroelectric state into its paraelectric state. These same properties can be made to reappear upon subsequent conversion of the polymer back into a ferroelectric state. Such changes in thermodynamic states can be brought about, for example, by changes in temperature. The Curie transition temperature, often abbreviated as Tc, is the temperature at which this change in state occurs. The Curie transition temperature of the ferroelectric polymer film is preferably 90 to 145° C. Within this range, a Curie transition temperature of greater than or equal to 100° C. is preferred, and greater than or equal to 110° C. more preferred.

The fractionated polymer film, for example a film having a narrower molecular weight distribution and/or a molecular weight distribution ratio of less than 1.3, when ferroelectric, may be used in a data processing device, including, for example, a logic element configured memory cells as described in United States Patent Application No. U.S. 2002/0044480 to Gudesen et al. Such a device, for example, is a data storage device wherein a ferroelectric polymer film is located preferably as a continuous layer or sheet between a first and a second electrode structure of strip electrodes. The first and the second electrode structure are dimensioned, located and positioned to form a two-dimensional x, y-matrix with, for example, the x electrodes being columns in the matrix, and the y electrodes being rows in the matrix. The portion of the ferroelectric polymer film at an intersection between an x electrode and a y electrode of the electrode matrix forms a logic element electrically connected to respective driver and control circuits for driving the electrodes and detection of output signals, thus forming the data processing device.

The disclosure is further illustrated by the following non-limiting example.

Poly(vinylidene fluoride-co-trifluoroethylene) (78 mol %/ 22 mol %) was obtained from Solvay Corporation. About 1% by weight of this polymer was dissolved in acetonitrile. Water was added to the solution until the solution became turbid. The solution was then heated to about 45° C. until the turbid solution became clear. The heated solution was transferred to a separatory funnel and incubated overnight in an insulated chamber at a constant temperature of 1 to 3° C. above room temperature, using an incandescent lamp and temperature controller to maintain the temperature. After about 14 hours, a concentrated fraction formed at the bottom of the separatory funnel. This fraction was withdrawn and the clear fraction (i.e., mother liquor) was transferred to the flask for further extraction. The concentrated fractionated polymer portion was dried under vacuum and the molecular weight and the molecular weight distribution of the fractions were determined by gel-permeation chromatography using tetrahydrofuran as the eluant and evaporative light scattering detection. The molecular weight distributions of the fractions obtained from this method were 1.07.

FIG. 1 is a chromatogram showing (a) a polymer composition that has not been fractionated; (b) a polymer composition fractionated with tetrahydrofuran; and (c) a polymer composition fractionated with acetonitrile. As can be seen from FIG. 1, fractionation with THF does not lead to significant improvement in the molecular weight distribution, whereas fractionation with acetonitrile clearly results in a composition having a narrower molecular weight distribution.

What is claimed is:

1. A process for fractionating a vinylidene fluoride polymer, comprising:

adding a solvent precipitant to a solution comprising a vinylidene fluoride polymer and a solvent, to form a mixture, wherein the solvent has at least one polarizable functional group, wherein the precipitent is miscible with the solvent, and wherein the precipitant is added in an amount sufficient to produce, at a first temperature, a solid-liquid phase separation between the mixture and a fraction of the vinylidene fluoride polymer, based on the molecular weight of the vinylidene fluoride polymer, and isolating the weight-fractionated vinylidene fluoride polymer from the mixture.

2. The process of claim 1, wherein the vinylidene fluoride polymer comprises:

10 to 90 mol % of vinylidene fluoride; and 10 to 90 mol % of trifluoroethylene.

3. The process of claim 1, wherein the vinylidene fluoride polymer is ferroelectric.

4. The process of claim 1, wherein the molecular weight distribution ratio of the weight-fractionated vinylidene is less than 1.3.

5. The process of claim 1, further comprising heating the mixture to a second temperature sufficient to form a single phase; and cooling the mixture to a third temperature effective to produce a solid-liquid phase separation between the mixture and a fraction of the vinylidene fluoride polymer based on the molecular weight of the polymer.

6. A process for fractionating a ferroelectric polymer, comprising:

adding a solvent precipitant to a solution comprising a ferroelectric polymer and a solvent, to form a mixture, wherein the solvent has at least one polarizable functional group, wherein the precipitant is miscible with the solvent, and wherein the precipitant is added in an amount sufficient to produce, at a first temperature, a solid-liquid phase separation between the mixture and a fraction of the ferroelectric polymer, based on the molecular weigh of the ferroelectric polymer; and isolating the fractionated ferroelectric polymer from the mixture, wherein the isolated fraction has a narrower molecular weight distribution than the initial ferroelectric polymer dissolved in the solution.

7. The process of claim 6, wherein a molecular weight distribution ration of the weight-fractionated polymer is less than 1.3.

8. The process of claim 6, further comprising heating the mixture to a second temperature sufficient to form a single phase; and cooling the mixture to a third temperature effective to produce a solid-liquid phase separation between the mixture and a fraction of the ferroelectric polymer based n the molecular weight of the polymer.

* * * * *